United States Patent
Roth et al.

(10) Patent No.: US 6,898,510 B2
(45) Date of Patent: May 24, 2005

(54) METHOD OF CONTROLLING AN INTERNAL COMBUSTION ENGINE

(75) Inventors: Andreas Roth, Muehlacker-Lomersheim (DE); Michael Nicolaou, Ober-Ramstadt (DE)

(73) Assignee: Robert Bosch GmbH, Stuttgart (DE)

( * ) Notice: Subject to any disclaimer, the term of this patent is extended or adjusted under 35 U.S.C. 154(b) by 13 days.

(21) Appl. No.: 10/204,109

(22) PCT Filed: Feb. 8, 2001

(86) PCT No.: PCT/DE01/00472

§ 371 (c)(1), (2), (4) Date: Nov. 27, 2002

(87) PCT Pub. No.: WO01/61169

PCT Pub. Date: Aug. 23, 2001

(65) Prior Publication Data

US 2003/0140896 A1 Jul. 31, 2003

(30) Foreign Application Priority Data

Feb. 17, 2000 (DE) .......................... 100 07 208

(51) Int. Cl.⁷ ............................................... G06G 7/70
(52) U.S. Cl. .......................... 701/114; 701/84; 701/87; 701/90; 701/105; 701/110; 123/305; 123/399; 123/406.11; 123/406.18; 123/406.23; 123/406.24

(58) Field of Search .................................. 701/110, 114, 701/105, 84, 87, 90; 123/305, 399, 406.18, 406.23, 406.24, 406.25, 406.11

(56) References Cited

U.S. PATENT DOCUMENTS

| 4,437,442 | A | | 3/1984 | Yamaguchi ................. 123/417 |
| 6,497,212 | B2 | * | 12/2002 | Matsumoto et al. ........ 123/295 |
| 6,530,360 | B1 | * | 3/2003 | Kondo ................... 123/406.27 |
| 6,539,915 | B1 | * | 4/2003 | Wild et al. .................. 123/295 |

FOREIGN PATENT DOCUMENTS

| DE | 197 15 774 | 10/1998 |
| EP | 0 890 738 | 1/1995 |
| FR | 2 775 022 | 8/1999 |

* cited by examiner

Primary Examiner—Tony M. Argenbright
Assistant Examiner—Johnny H. Hoang
(74) Attorney, Agent, or Firm—Kenyon & Kenyon

(57) ABSTRACT

In a method of controlling an internal combustion engine, at least one operating variable is controlled, a pre-control ignition timing efficiency is formed as a function of operating parameters of the engine and/or external intervention measures, and the pre-control ignition timing efficiency determines the setpoint values of the at least one operating variable. In a transition from a first operating state to a second operating state, the pre-control ignition timing efficiency is varied by a transition function.

6 Claims, 1 Drawing Sheet

METHOD OF CONTROLLING AN INTERNAL COMBUSTION ENGINE

BACKGROUND INFORMATION

Figure 1:
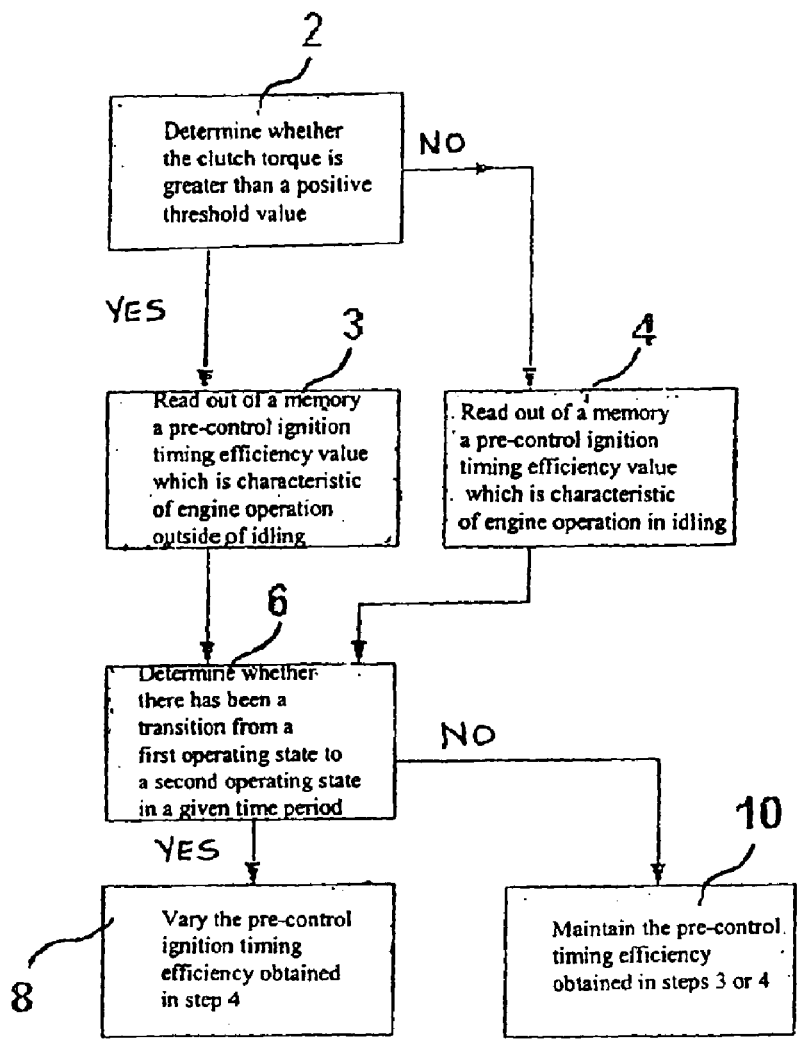

The present invention relates to a method of controlling an internal combustion engine according to the preamble of the independent patent claim.

Such a method is already known from Unexamined German Patent 197 15 774, which describes a method of controlling an internal combustion engine, at least one operating variable, e.g., a firing angle of one or more cylinders or the air supply being controlled by an actuating element. The firing angle and air supply are controlled on the basis of torque values, the firing angle being adjusted according to predetermined firing angle efficiencies. The firing angle efficiencies are taken into account in controlling the idling air in the sense of maintaining engine torque. The firing angle efficiencies are determined as a function of operating parameters of the engine such as the rotational speed and relative cylinder charge. The pre-control ignition timing efficiency is one of such firing angle efficiencies, which ensures that a change in torque is implemented only through the firing angle. If a torque request exceeds a limiting value for a firing angle, the air supply is altered accordingly. More precisely, the pre-control ignition timing efficiency ensures that a worsening of the efficiency setting performed in the firing angle path is taken into account in the air path in such a way that the torque set via the charge changes exactly by the same amount as that set on the basis of the firing angle. The transition between certain operating states is taken into account in the method described in Unexamined German Patent 197 15 774, in such a manner that a predetermined firing angle efficiency is altered in a manner that is not described in greater detail. This predetermined firing angle efficiency is compared with a base firing angle efficiency in a minimum value selection stage, the smaller value in each case, i.e., the inferior efficiency, being output as the pre-control ignition timing efficiency. The base firing angle efficiency describes an efficiency which is obtained from a firing angle of the internal combustion engine at the instantaneous operating point without any external intervention and a firing angle having the highest efficiency under the instantaneous operating conditions, as indicated in Unexamined German Patent 197 15 774.

ADVANTAGES OF THE PRESENT INVENTION

The method according to the present invention having the features of claim 1 has the advantage over the related art that the transition between various operating states is taken into account directly in calculating the pre-control ignition timing efficiency. This effectively prevents sudden changes in firing angle which result from forming a minimum value.

Advantageous refinements of the method characterized in the main claim are possible through the measures characterized in the subclaims. It is especially advantageous that the operating states "idling" and "not idling" are taken into account through certain ranges of the clutch torque value. It is advantageous to calculate the clutch torque from the engine torque and from the torque loss, so that the engine losses are compensated in idling in particular.

It is also advantageous that the pre-control ignition timing efficiency is read directly from different engine characteristics maps in different operating states, because dynamic changes in operating variables of the engine may be taken into account better. It is advantageous to address the engine characteristics maps as a function of the relative cylinder charge and the engine rotational speed.

DRAWING

The present invention is explained in greater detail below on the basis of the embodiments illustrated in the drawing. FIG. 1 illustrates, on the basis of a block diagram, a method of controlling an engine.

DESCRIPTION OF THE EXEMPLARY EMBODIMENTS

FIG. 1 shows a preferred embodiment of a method of controlling an internal combustion engine. The block diagram represents the structure of this program, the individual blocks indicating the corresponding program parts, characteristic curves, engine characteristics maps, tables, etc., while the connecting lines show the interaction of these program elements.

A check is performed in step 2 to determine whether the clutch torque which may assume a value of less than, more than, or equal to zero is greater than a positive threshold value. The clutch torque is composed of the instantaneous engine torque from which the torque loss is subtracted. The engine torque is the torque supplied by the engine at the instantaneous operating point. The torque loss is the torque the engine must expend to compensate for friction losses, thermal losses and other losses. If the clutch torque is greater than a predetermined threshold value, the method then goes to step 3; otherwise the method goes to step 4. In step 3, a pre-control ignition timing efficiency value which is characteristic of engine operation outside of idling is read out of a memory.

In step 4, a pre-control ignition timing efficiency value which is characteristic of engine operation in idling is read out of a memory. The values read out of a memory in step 3 and/or step 4 may also be read out of an engine characteristics map or a characteristic curve, depending on the load and/or rotational speed. The characteristic curves or maps in step 3 differ from those in step 4 because they represent different operating states. The characteristic curve or the engine characteristics map in step 4, i.e., for idling, may also be calculated from the engine characteristics map in step 3, by subtracting a certain fixed firing angle from a firing angle belonging to a pre-control ignition timing efficiency from step 3, and converting the resulting firing angle to a respective pre-control ignition timing efficiency. Thus the pre-control ignition timing efficiency has different values for different operating states. Then the method is continued with step 6, where a check is performed to determine whether there has been a transition from a first operating state to a second operating state in a given period of time. If this is the case, the method continues with step 8; otherwise the method goes to step 10.

In step 8, the pre-control ignition timing efficiency obtained in step 4 is varied using a transition function. This transition function ensures that the transition from a first operating state to a second operating state takes place gradually and thus there are not any sudden changes in firing angle or torque. Such a transition function may be obtained, for example, from the pre-control ignition timing efficiency of the preceding cycle, for example, which is extrapolated in the direction of the instantaneous pre-control ignition timing efficiency belonging to a new operating state.

In step 10, the pre-control ignition timing efficiency calculated in step 3 or 4 is not changed because there has not been a transition from a first operating state to a second operating state over a certain period of time. The pre-control ignition timing efficiency is then processed further by analogy with the procedure described in Unexamined German Patent 197 15 774, and the firing angle or the position of the actuating element for the air supply is calculated therefrom.

In another exemplary embodiment, it is also possible to check on an idling bit in step 2, in addition to the clutch torque, to determine whether or not it has been set. The idling bit is set, i.e., is high, when the throttle valve is closed. If the throttle valve is closed, the method goes to step 4; otherwise, the method goes to step 3. The two conditions, i.e., clutch torque and/or idling bit, may be provided with an AND/OR gate. The following steps 3 through 10 are processed in this embodiment by analogy with the embodiment described above.

Similar embodiments may also be implemented for other operating states of the engine, e.g., for the operating state of partial load. The method according to the present invention ensures that a smooth transition between different operating states will be taken into account in a central variable, the pre-control ignition timing efficiency, and thus sudden changes in torque and/or firing angle are prevented.

What is claimed is:

1. A method of controlling an internal combustion engine in which at least one operating variable of the engine is controlled, the method comprising:

forming a pre-control ignition timing efficiency as a function of at least one of: operating parameters of the engine and external intervention measures, the efficiency determining setpoint values of the at rating variable; and varying, in a transition from a first operating state to a second operating state, the pre-control ignition timing efficiency by using a transition function.

2. The method according to claim 1, wherein the first operating state is characterized by a clutch torque less than or equal to zero and the second operating sate is characterized by a clutch torque greater than zero.

3. The method according claim 2, further comprising obtaining the clutch torque by subtracting a torque loss from an engine torque.

4. The method according to claim 1, further comprising:

reading the pre-control ignition timing efficiency out of a first characteristics map in the first operating state; and reading the pre-control ignition timing efficiency out of a second characteristics map in the second operating state.

5. The method according to claim 4, wherein the second characteristics map is a second engine characteristics map, and further comprising addressing the first characteristics map and the second engine characteristics map using a relative cylinder charge and an engine rotational speed.

6. The method according to claim 1, wherein the pre-control ignition timing efficiency is varied gradually during the transition.

* * * * *

UNITED STATES PATENT AND TRADEMARK OFFICE
CERTIFICATE OF CORRECTION

PATENT NO. : 6,898,510 B2
DATED : May 24, 2005
INVENTOR(S) : Andreas Roth et al.

It is certified that error appears in the above-identified patent and that said Letters Patent is hereby corrected as shown below:

<u>Title page,</u>
Item [57], ABSTRACT,
Line 1, change "In a method" to -- A method --.

<u>Column 1,</u>
Lines 6-8, delete "The present invention … patent claim.".
Line 9, delete "Such a method … Unexamined".
Line 10, change "German Patent 197 15 774, which describes," to -- German Patent No. 197 15 774 describes --.
Line 34, change "German Patent 197 15 774" to -- German Patent No. 197 15 774 --.
Line 34, delete "Unexamined".
Line 48, change "ADVANTAGES OF THE PRESENT INVENTION" to
-- SUMMARY OF THE INVENTION --.
Lines 50-51, delete "having the features of claim 1".
Line 53, change "efficiency." to -- efficiency (pilot control firing angle efficiency). --.

<u>Column 2,</u>
Line 5, change "DRAWING" to -- BRIEF DESCRIPTION OF THE DRAWING --.
Lines 7-8, delete "The present … in the drawing.".

<u>Column 3,</u>
Lines 4-5, change "in Unexamined German Patent 197 15 774" to -- in German Patent No. 197 15 774 --.

UNITED STATES PATENT AND TRADEMARK OFFICE
CERTIFICATE OF CORRECTION

PATENT NO. : 6,898,510 B2
DATED : May 24, 2005
INVENTOR(S) : Andreas Roth et al.

It is certified that error appears in the above-identified patent and that said Letters Patent is hereby corrected as shown below:

<u>Column 4,</u>
Line 2, change "of the at rating" to -- of the at least one rating --.
Line 9, change "the second operating sate" to -- the second operating state --.

Signed and Sealed this

Twenty-first Day of March, 2006

JON W. DUDAS
*Director of the United States Patent and Trademark Office*